(12) United States Patent
Piñas et al.

(10) Patent No.: US 6,507,506 B1
(45) Date of Patent: Jan. 14, 2003

(54) DUAL VOLTAGE ELECTRICAL DISTRIBUTION SYSTEM

(75) Inventors: Joan Fontanilles Piñas, Valls (ES); Carles Borrego Bel, Reus (ES); Jordi Bigorra Vives, Valls (ES); Jordi Giro Roca, Reus (ES); Luis Martinez-Salamero, Vinyols I Els Arcs (ES); Javier Maixe Altes, Tarragona (ES); Hugo Valderrama Blavi, Tarragona (ES)

(73) Assignee: Lear Automotive (EEDS) Spain, S. L., Tarragona (ES)

( * ) Notice: Subject to any disclaimer, the term of this patent is extended or adjusted under 35 U.S.C. 154(b) by 0 days.

(21) Appl. No.: 09/980,709

(22) PCT Filed: Jun. 9, 1999

(86) PCT No.: PCT/ES99/00173

§ 371 (c)(1),
(2), (4) Date: Apr. 15, 2002

(87) PCT Pub. No.: WO00/77916

PCT Pub. Date: Dec. 21, 2000

(51) Int. Cl.[7] .............................. H02M 3/24; G05F 1/613
(52) U.S. Cl. ....................... 363/79; 363/59; 363/65; 323/225; 307/10.1; 307/82
(58) Field of Search .......................... 363/65, 67, 71, 363/59, 74, 78, 79, 142; 323/222, 225; 320/140; 307/10.1, 10.7, 82

(56) References Cited

U.S. PATENT DOCUMENTS

| 4,186,437 A | 1/1980 | Cuk | ............. 363/65 |
| 4,723,105 A | 2/1988 | Matouka et al. | |
| 5,164,655 A | 11/1992 | Heavey | |
| 6,230,358 B1 * | 11/2001 | Miller | ........... 323/222 |
| 6,323,608 B1 * | 11/2001 | Ozawa | ........... 320/140 |

FOREIGN PATENT DOCUMENTS

EP  0 722 211  7/1996

OTHER PUBLICATIONS

Kazimierczuk et al, *Proceedings of the National Aerospace and Electronics Conference (NAECON)*, U.S.., New York, IEEE, pp. 435–441 (1993) (no month).
Majo et al, *IEICE Transactions on Communications, JP, Institute of Electronics Information and Comm. Eng. Tokyo*, E75 (11):1134–1141 (1992) (no month).
Caricchi et al, *Proceedings of the Annual Applied Power Electronics Conference and Exposition (APEC)*, US, New York, IEEE, Conf. 9:381–386 (1994) (no month).
Biswajit, *Proceedings of the International Symposium on Circuits and Systems (ISCS)*, US, New York, IEEE, pp. 2347–2530 (1993) (no month).

* cited by examiner

*Primary Examiner*—Jessica Han
(74) *Attorney, Agent, or Firm*—Sughrue Mion, PLLC

(57) ABSTRACT

The invention is designed for vehicles having two electrical power supply systems and corresponding differentiated voltage level charges and two batteries operating at a first and a second voltage level. A bidirectional voltage converter cooperates with both systems whose input and output stages are galvanically insulated and include a switch. The batteries are connected to said input and output at a first and a second voltage level so that said bidirectional converter can provide a first reduced voltage mode and a second increased voltage mode. The passive components, e.g. the magnetic components and capacitances, of said stages have been chosen to provide an identical transitional behavior in both modes when a disruption occurs in the regulating system either in the charge or the input voltage.

14 Claims, 4 Drawing Sheets

DUAL VOLTAGE ELECTRICAL DISTRIBUTION SYSTEM

FIELD OF THE INVENTION

The present invention refers to a dual voltage electrical distribution system applicable to vehicles which possess two network sectors and charges prepared to operate at two different voltage levels, for example at 42 V and at 14 V, generated by at least two batteries, one of which is at a first voltage level of, e.g. 36 V, and another at a second lower voltage level of, e.g. 12 V, there being at least one voltage converter associated with the two said network sectors.

The present invention is useful in the automotive industry.

BACKGROUND OF THE INVENTION

In modern vehicles there is a tendency towards increasing electrical and electronic equipment which results in a growing consumption of electrical energy. This makes it advisable to increase the current nominal voltage of the vehicle's electrical system by up to three times, that is, from the current 14 V DC to 42 V DC. However, due to the conveniently calculated and designed current manufacturing and installation infrastructures of electrical systems which already exist in the automotive industry, a sudden transition from one voltage to another is made very difficult.

A solution has been proposed in order to avoid said sudden transition, which consists of implementing an electrical and electronic distribution system architecture for the vehicle using networks operating at two different voltage levels, which has been called "dual voltage system". Thus, some components will continue to work at 14 V, as until now, so that it will not be necessary to introduce changes in their electrical control and distribution networks, while other components will come to work at 42 V, with a more appropriate output and/or optimisation of their performance.

Said dual voltage system may be basically achieved in two ways: either with a single 42 V battery and a unidirectional DC/DC voltage converter from 42 to 14 V; or with two 14 and 42 V batteries respectively, and a bidirectional DC/DC voltage converter from 14 to 42 V or vice versa.

The converter is a key piece of the new system in any of the solutions.

Patent WO 97/28366 is an example of the utility of having a dual voltage system in automotive vehicles, describing an ignition system for internal combustion engines which uses a dual voltage electrical supply, with a higher voltage to produce a high-intensity electric arc and a lower voltage to cause ionisation. A signal controller analyses the ionisation signal to determine a series of parameters concerning the correct operation of the ignition.

Patent WO 95/13470 describes another ignition system for internal combustion engines supplied by dual voltage supplied by a single supply source and subsequently dualised by a DC/DC voltage converter.

Patent EP-A-0892486 describes a unidirectional converter device to supply dual voltage from a single supply source.

The introduction of the new architecture of the dual voltage system in automotive vehicles carries with it an increase in the complexity of electrical networks. The system includes, as stated hereinbefore, one or two accumulators or batteries, a converter and one or more distribution boxes in which electronic signal and power control means are centralised, including a microprocessor and electrical protection means. The vehicle also comprises an electric generator, usually an alternator, which supplies current to the accumulator or accumulators by means of a rectifier, and which also directly supplies most of the components when the vehicle is running.

Increasing the voltage (Volts.) threefold (42 V) involves the reduction of current (A) for the same amount of power. Fewer amperes mean smaller cable cross-section for supplying current, with consequently less weight and lower consumption.

References to the subject and objects of this invention are also found in different publications, among which the following may be mentioned: J. G. Kassakian "Challenges of the new 42 V architecture and progress on its international acceptance" VDI 98 Baden-Baden; Intersociety Energy Conversion Engineering Conference (IECEC) "Multiple Voltage Electrical Power Distribution System for Automotive Applications" 31st. Washington 96; "Draft specification for 42 V battery in a 2-voltage vehicle electrical system for BMW and Daimler-Benz SICAN" 29.6.98; MIT Auto-Consortium-42V Net Research Unit #1 "DC/DC converters for Dual Voltage Electrical Systems".

Kazimierczuk M K et al. "Topologies of Bidirectional PWM DC—DC power converters" PROCEEDINGS OF THE NATIONAL AEROSPACE AND ELECTRONICS CONFERENCE. (NAECON 1993), US, NEW YORK, IEEE, VOL 1, pages 435441, describes a power system of an aircraft for normal and emergency operation (see FIG. 1) as well as several block diagrams and topologies of bidirectional converters, in particular FIG. 3 equivalent to the topology of FIG. 3 of the drawings of this invention, which are detailed in the preamble of claim 1 of the invention.

BRIEF EXPLANATION OF THE INVENTION

In accordance with the invention, the dual voltage electrical distribution system will to be implemented using a bi-directional voltage converter, with its input and output stages galvanically insulated, and including in each of said stages a switching device, whose bi-directional converter has said batteries at a first voltage level and at a second voltage level connected to said inputs and outputs, so that said bi-directional converter circuit provides two energy transfer modes which constitute a first mode of voltage reduction and a second mode of voltage raising, having chosen the passive components, that is the magnetic components and capacitances of said stages to provide an identical transitory behaviour in both modes when either a disturbance in the charge or in the input voltage enters into the regulation system.

More specifically, the proposed bi-directional converter is a galvanically insulated DC version of a converter circuit with the Cuk topology, symmetrical with respect to the area of insulation, in which said batteries are connected to its input and output at a first voltage level and at a second voltage level respectively, with a capacitance in parallel with each of said voltage sources, in addition to the storage capacitance typical of the topology, in series with the inductances of the input and output circuit, said switching device being arranged in the input and output stages of the converter, on each side of said galvanic insulation.

The main differences between the basic unidirectional converter circuit and the proposed converter are:

a) bi-directional power flow;
b) no change in output voltage polarity;
c) simplification of the converter control design.

The invention will be better understood from the following description given in connection with the attached drawings.

Until now, the converter has been situated in some part of the electrical networks separated from the distribution box or boxes. However, this arrangement has several drawbacks, such as: an increase in the connection cabling which, on the one hand, involves a greater voltage drop and, on the other, affects the manufacturing cost, the vehicle's weight and, consequently, fuel consumption; also, a greater occupation of the volume inside the already scarce space of the engine compartment; an increase in the fixing points of components to the vehicle with greater complexity of assembly; an increase in the number of electrical components subjected to vibration, which reduces the system's reliability; a redundancy of systems, for example, a microprocessor for the converter and a microprocessor for the distribution box; greater difficulty for thermal dissipation of components arranged in separate boxes; greater difficulty in achieving electromagnetic compatibility due to the incorporation of cables which produce high frequency emissions which cause interference in the components of the distribution box.

The invention also proposes to incorporate said bi-directional voltage converter in an electrical distribution box of the vehicle, together with centralised electronic signal and power control means, including a microprocessor and electrical protection means.

The invention will be better understood from the following description of embodiments, with reference to illustrative drawings.

DETAILED DESCRIPTION OF THE PREFERRED EMBODIMENTS

Figure 1:
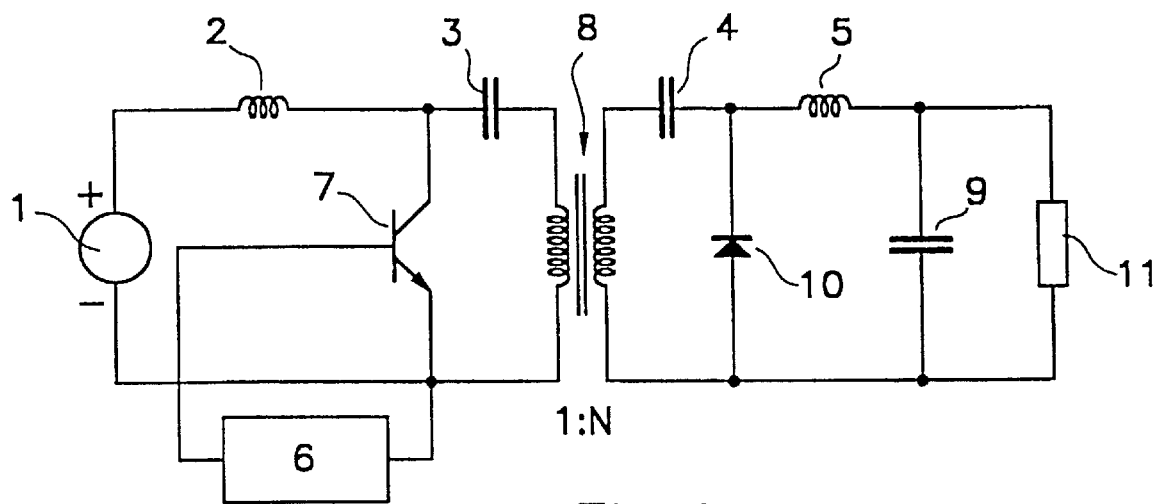
FIG. 1 is a schematic drawing of a unidirectional voltage converter according to the state of the art, specifically corresponding to the example of embodiment of FIG. 10 of said patent U.S. Pat. No. 4,184,197.
Figure 10:
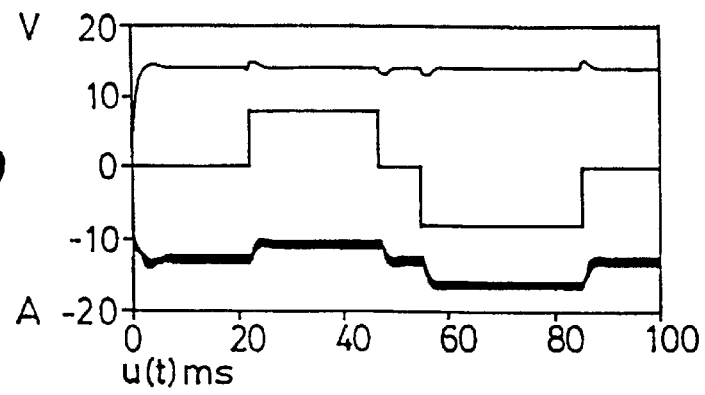

FIG. 1 illustrates a converter circuit galvanically insulated by the transformer 8 which corresponds to the Example of FIG. 10 of U.S. Pat. No. 4,184,197, that is, with an inductance 2 in series with the input voltage source and another inductance 5 in series with the charge 11. In that converter the transformer 8 with the transformation ratio N is disconnected from the direct voltage by means of the condensers 3, 4. The input source is indicated by the number and the voltage switching source by the reference 6. Other components are the transistor 7 associated with the switching device 6 and the diode 10 and condenser 9 in the output sector of the converter, in accordance with said well-known topology in the state of the art.

Figure 2:
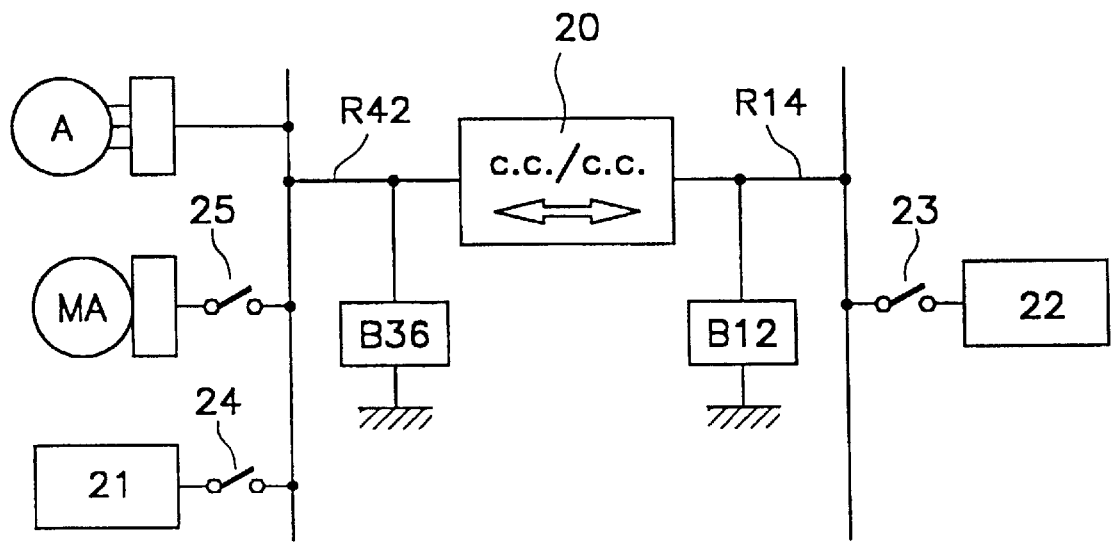
FIG. 2 shows the principle of the dual voltage electrical distribution system in accordance with this invention.

In the diagram of FIG. 2, which illustrates the principle of the electrical distribution system according to the invention, an alternator A is represented and also at least one first battery B36 or 36 V DC accumulator which, in combination, constitute a power generator unit for a vehicle. The joint action of the alternator A and said first battery B36 provides the 42 V of the first network R42.

The system provides for the use of a second battery B12 or 12 V DC accumulator, constituting a second power generator suitable for supplying a second network R14, jointly with the alternator A, at 14 V. As an interface between both networks a bi-directional voltage conversion block 20 is provided. Each network supplies its own charges which are indicated here by the numerical references 21 and 22, which will be connected by appropriate means, represented in diagrammatic form here by corresponding switches 23, 24. The diagram of said FIG. 2 also includes a starter motor SM, controlled by means of a corresponding connection switch 25.

Figure 3:
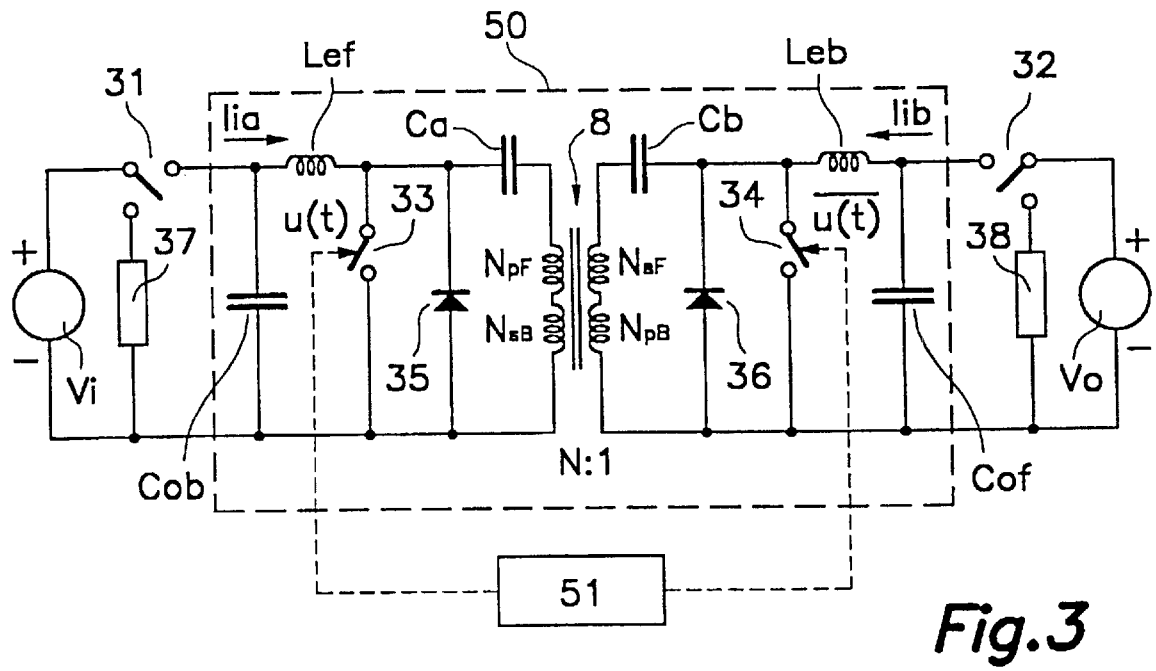
FIG. 3 shows an example of a possible embodiment of a bi-directional converter circuit in accordance with this invention, with a schematic indication of the voltage switching source.

With reference to FIG. 3, the converter with a Cuk topology with galvanic insulation has a transformer with a ratio of $$\frac{N_{pF}}{N_{aF}} = \frac{N_{aB}}{N_{pB}}$$

two switches 33 and 34, both controlled by a signal switching source 51 (see also FIG. 4), which will apply the current functions U(t) and U(t) with work cycles D and 1-D respectively, and two diodes 35 and 36. In this converter, the transformer 8 with a transformation ratio N is disconnected from the direct current by means of the condensers Ca and Cb. If the same voltage polarity is desired at the input and the output, the winding of the primary must be the reverse of the secondary. The ratio N will be designed in such a way that, Vi being the input voltage and Vo the output voltage of the converter $$\frac{N_{pF}}{N_{aF}} = \frac{N_{aB}}{N_{pB}}$$

is complied, where D'=1-D. The minimum values of the inductors Lef and Leb and of the condensers Ca and Cb will be chosen according to the maximum current and voltage ripple respectively needed.

OPERATING MODES

Voltage reduction mode: Vi→charges 38 (connection through the switch 32).

In this operating mode the switch 33 (which can be implemented by a MOS FET transistor, for example) will switch with a work cycle D and the interrupter 34 will be permanently open.

During the interval D'×Ts, when the switch 33 is open, the current to the input Iia charges the inductor Lef and the condenser Ca, and the reflected current of the secondary NsF of the transformer 8 charges the condenser Cb. The inductance Leb of the output discharges to the charge 38 and the diode 36 conducts the sum of the current of the secondary and that of the output.

During the interval D'×Ts, when the switch 33 is closed, the input current Iia charges Lef. the reflected current in the secondary of the discharge of Ca discharges Cb and charges Leb, supplied by the high-capacity condenser Cof of the output. In this case, the switch 33 conducts the sum of the input current Iia and that of the primary NpF of the transformer 8, the diode 36 remaining in open circuit.

Voltage raising mode: Vo→charges 37 (connected by the switch 31).

In this operating mode the switch 34 will switch with a work cycle 1-D and the switch 33 will be permanently open.

During the interval D×Ts, when the switch 34 is open, the current to the input Iib charges the inductor Leb and the condenser Cb, and the reflected current of the secondary NsB of the transformer 8 charges the condenser Ca. The inductance Lef of the output discharges to the charge 37 and the diode 35 conducts the sum of the current of the secondary and that of the output.

During the interval D×Ts, when the switch 34 is closed, the input current Iib charges Leb, the reflected current in the secondary of the discharge of Cb discharges Ca and charges Lef, supplied by the high-capacity condenser Cob of the output. In this case, the switch 34 conducts the sum of the input current Iib and that of the primary NpB of the transformer 8, the diode 35 remaining in open circuit.

Aanlysis of the Conventer, Stationary and Dynamic Regime

The transfer function in stationary regime in each operating mode, that is, in voltage raising mode and in voltage reduction mode, is the following:

a) Reduction mode $(Vi = 42 \rightarrow Vo = 14)$   $\frac{V_o}{V_i} = \frac{1}{N} \cdot \frac{D}{1-D}$ b) Raising mode $(Vi = 14 \rightarrow Vo = 42)$   $\frac{V_o}{V_i} = N \cdot \frac{1-D}{D}$ where D is the work ratio of the control signal U(t), and N is the ratio of turns of the transformer.

As mentioned hereinbefore, the Cuk converter is a system without non-linear minimum phase. These features make the control design difficult if what must be ensured is a good dynamic response, robustness and stability for a wide interval of operating points (many conditions of different charge and line).

In particular, the position of the open loop complex conjugated poles of the converter is completely dependent on the work ratio D of the control signal of the converter U(t).

Since the converter is bi-directional, two different converters have to be controlled with a single control panel.

Using the small signal model derived from the averaged space model of the state of the converter, and assuming separable dynamics, the dynamics in open loop for both modes are:

a) Reduction mode (Vi=42→Vo=14)

$$f_{p1d} = \frac{1-D}{2\pi \sqrt{L_{eb} \frac{C_a C_b}{N^2 C_a + C_b}}}$$

$$f_{p2d} = \frac{1}{2\pi \sqrt{L_{eb} C_{of}}}$$

$$f_{zd} = \frac{\sqrt{1-D}}{2\pi \sqrt{L_{ef} \frac{C_a C_b}{N^2 C_a + C_b}}}$$

b) Raising mode (Vi=14→Vo=42)

$$f_{p1u} = \frac{D}{2\pi \sqrt{L_{eb} \frac{N^2 C_a C_b}{N^2 C_a + C_b}}}$$

$$f_{p2u} = \frac{1}{2\pi \sqrt{L_{eb} C_{ob}}}$$

$$f_{zu} = \frac{\sqrt{D}}{2\pi \sqrt{L_{ef} \frac{N^2 C_a C_b}{N^2 C_a + C_b}}}$$

where fp1 are the rapid poles and determine the energy transfer dynamics, while the poles fp2 are slow and depend on the design conditions of the ripple of the output voltage. Finally, the fz are the zeros of the converter.

Design Commitments

The condition of separability of the poles means that the slow poles must be situated as far as possible from the rapid poles. Consequently, fp1d=10.fp2d fp1u=10.fp2u In order to simplify the design of the control loops, the converter must have an equally dynamic behaviour in both operating modes, and as a result an operating point is obtained in which it is required that D=1-D. Therefore, the work ratio must be D=0.5. This work ratio is slightly different from the switching ratio used optimally, which, in the Cuk converter, reaches D=0.33 (see S. Cuk, "Switching DC to DC converter with zero input or output current ripple" in Proc. IEEE Industry Appl. Soc. Annual Meet., Toronto, Ont., Canada, 1978 pp 1131–1146.

When the work ratio of the nominal work point is fixed at D=0.5, the reduction and raising ratio in stationary regime depends only on the ratio of turns N of the transformer, which consequently must be N=3 to achieve the transformation 42→14 (and vice versa).

Having fixed the values of the work ratio D, the ratio of turns of the transformer N, and fixing the conditions of dynamic equality (fp1d=fp1u, fp2d=fp2u, fzd=fzu) the ratios between the different elements of energy storage will be as follows:

$L_{ef} = N^2 \cdot L_{eb}$ $C_{of} = N^2 \cdot C_{ob}$ $C_b = N^2 \cdot C_a$

Figure 4:
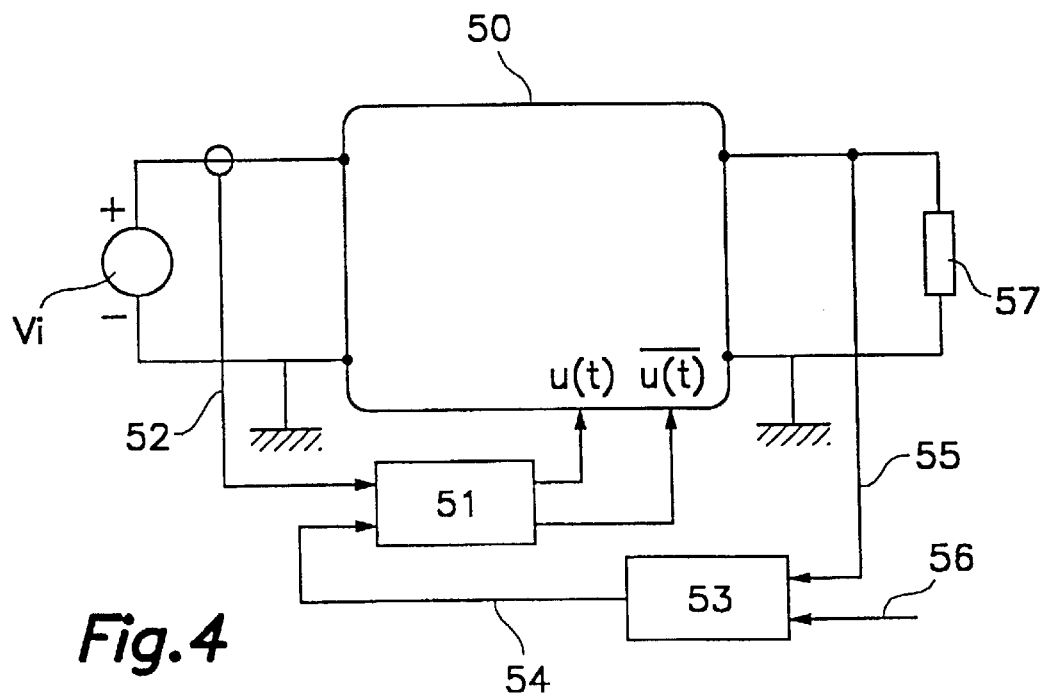
FIG. 4 corresponds to a diagram of the double loop control used to manage the bi-directional converter circuit according to FIG. 3.

FIG. 4 represents a possible control of the bi-directional converter by means of a double loop, of the type known as "Control in Averaged Current Mode", consisting of an inner loop of current and an outer loop of voltage which ensure the regulation of line and charge with their own protection of the switching transitions. Thus, said control system of the bi-directional converter 50, comprises a block 51 which controls the input current by modulating the width of PWM impulses, with a power point 52 from said inlet, which block 51 applies the functions of switching to the first and second stages of the bi-directional converter circuit 50, illustrated in FIG. 3 and a control block 53 of outlet voltage, to which a reference voltage 56 is applied and with a voltage power point 55 from said outlet, which second block 53 provides the first one 51 with a reference current through said inner loop 54. In this case, the charge on which the converter 37 and 38 operates is indicated by 57 in FIG. 3.

Figure 5:
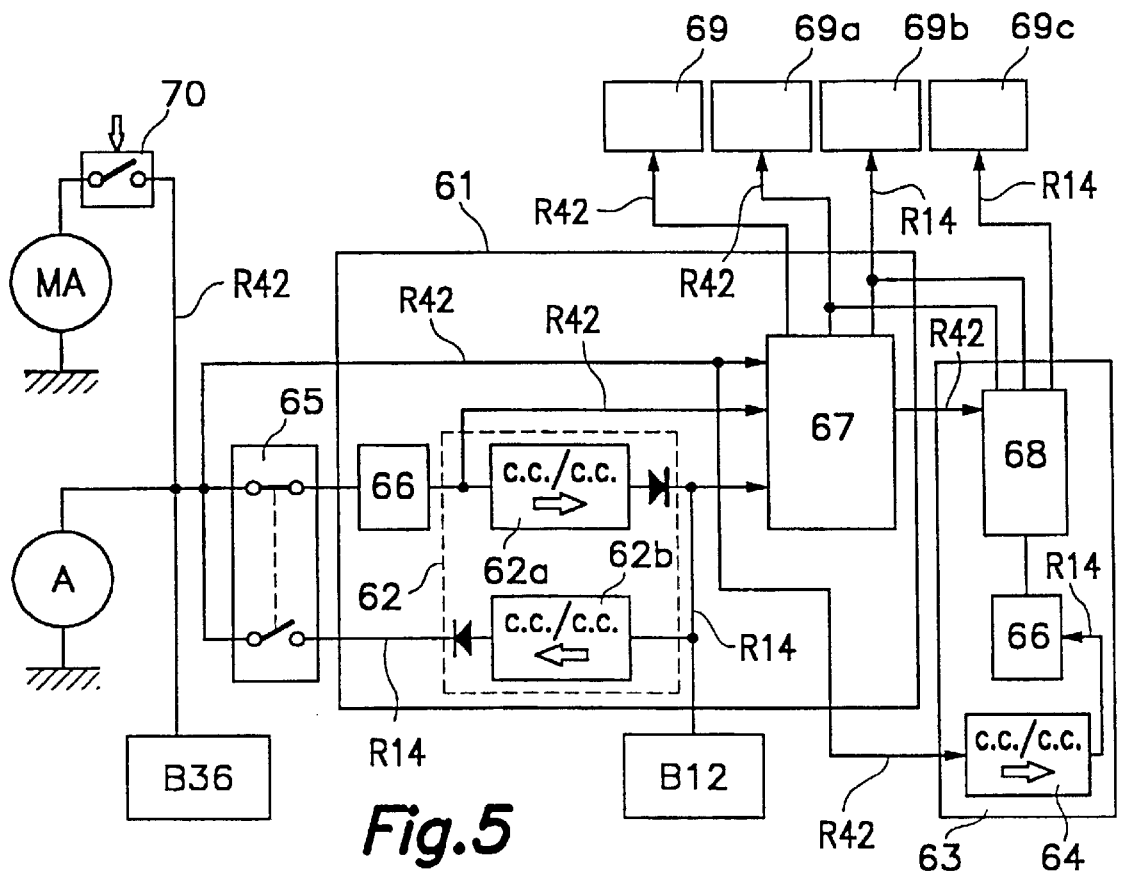
FIG. 5 is a schematic drawing showing the current flows in a dual voltage electrical system of a vehicle which incorporates an electrical distribution box with a bi-directional converter in accordance with the invention, in combination with a second electrical distribution box which includes a unidirectional converter, corresponding to a de-centralised distribution, that is, with a voltage conversion distributed in several areas of the vehicle.

With reference now to the diagram in FIG. 5, this shows only some of the current flows between the component blocks diagrammatically linked in power, a network R42 maybe observed which operates at 42 V DC and a network 14 which operates at 14 V DC. In said FIG. 5, a first example of the electrical distribution system according to the invention is shown, organised in a de-centralised form, that is, with the voltage conversion distributed in several parts of the vehicle. In said drawing, an electrical distribution box 61 incorporates a bidirectional converter 62 schematised by means of two converter blocks 62a, 62b, to generate a dual voltage and the system includes, in combination, a second distribution box 63 including another unidirectional converter 64. In this example, the alternator A, together with the first 36 V DC battery B36, supply current at 42 V to the box 61 through a power switch 65. The numeric references 67 and 68 indicate units which include centralised electronic signal and power control means, including a microprocessor and electrical protection means. Reference number 66 indicates an ignition relay, which only provides a supply to said converters 62, 64 or control units 67, 68, in the event that the ignition switch of the automobile is closed. 69a and 69c indicate the different charges which can be connected to one or another box 61, 63, which in the case of 69a and 69c are also controlled by said ignition relay 66.

Figure 6:
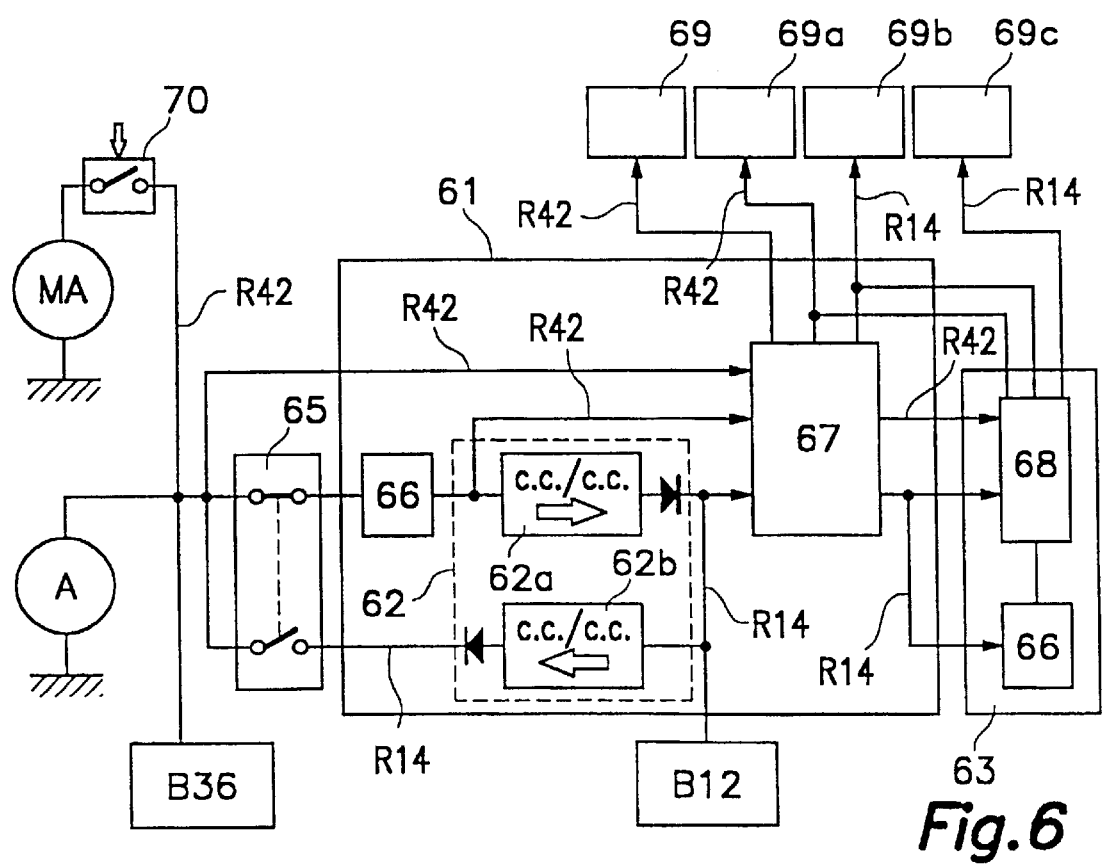
FIG. 6 is equivalent to the foregoing but shows a centralised assembly, in which only one electrical distribution box includes said bi-directional converter.

FIG. 6 shows a variant of the electrical distribution system in accordance with a centralised organisation, which differs from the example illustrated in FIG. 5 only in the fact that the second distribution box 63 does not include a converter, so that its management and control unit 68 is supplied from the first unit 67 with two different voltages through the networks R42 and R14. The same references are used in said second Figure as in the previous Figure.

Figure 7:
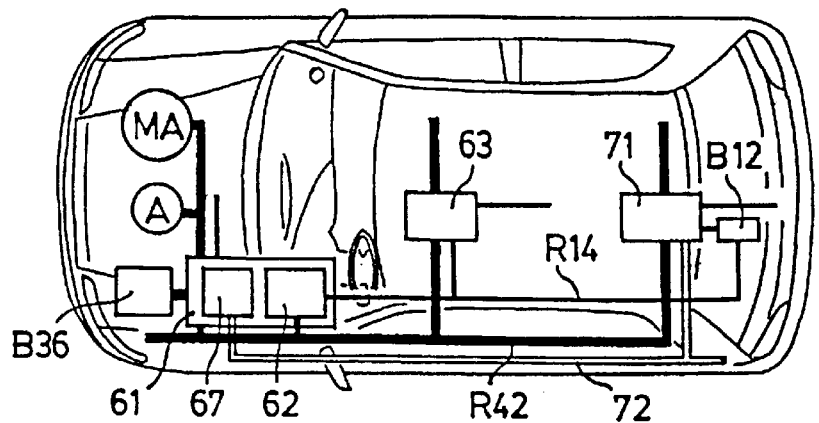
FIG. 7 shows an example of a possible organisation in a vehicle of the proposed system, de-centralised, with several electrical distribution boxes, including converters in at least two of them, one of said converters being bi-directional.

FIG. 7 schematically illustrates a vehicle in which a dual voltage distribution system has been implemented in accordance with what is described, in which three centralised electrical distribution boxes 61, 63, 71, have been provided in the engine compartment, passenger compartment and boot, respectively. The first box 61 includes a power management and control unit 67 and a bidirectional converter 67, associated with a battery B36. The box 36 is connected by cabling or a bus R42 (high voltage level) and by a second bus R14 (low voltage level) to the first box 61. The third box 71 is connected in general to the first one 61, as to the second 63, and also has associated a second battery B12. The network 72 connects the boxes 61 and 71.

Figure 8:
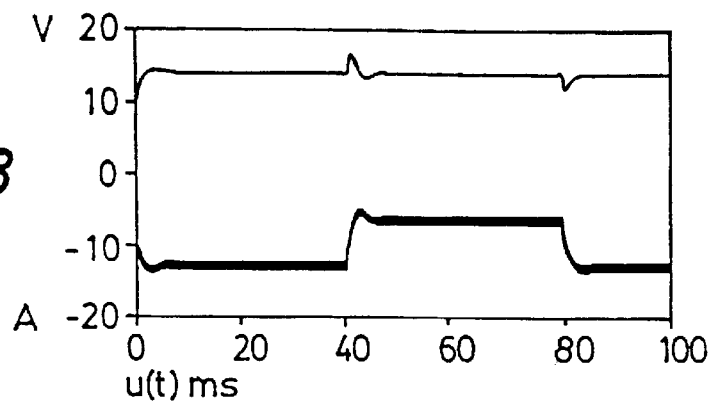
FIGS. 8, 9 and 10 are graphs of examples of simulations in averaged current control mode of the bi-directional converter according to the invention.
Figure 9:
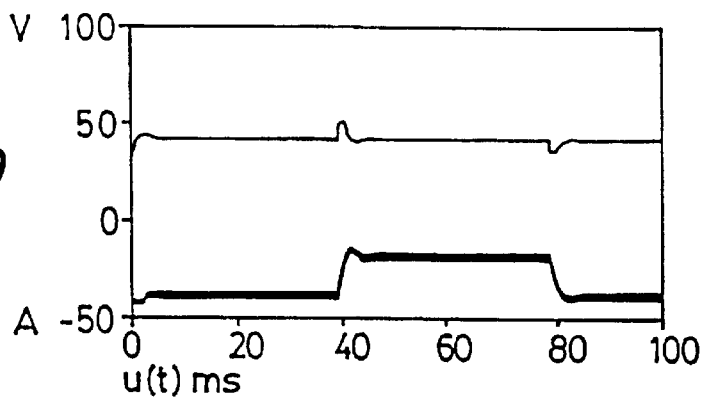

FIGS. 8 to 10 show a simulation of the "Control in Averaged Current Mode" strategy. FIG. 8 is a transitory charge simulation for the voltage reduction mode. FIG. 9 is a transitory simulation for the voltage raising mode and finally FIG. 10 shows a line transitory in voltage reduction mode.

It is evident that other simulations for alternative simulation strategies would be possible, for example the "Control in Hysteresis Current Mode".

What is claimed is:

1. A dual voltage electrical distribution system for vehicles with two sectors of network and charges prepared to operate at two different voltage levels, generated by at least two batteries at a first voltage level, and at a second lower voltage level, with said two sectors of network having associated at least one bi-directional voltage converter, comprising a version that is galvanically insulated in DC of a converter circuit with a Cuk topology, symmetrical with the area of insulation, a battery being connected to its input and output insulated stages at a first voltage level and at a second voltage level respectively, with a capacitance in parallel with each of said voltage sources, in addition to the storage capacitance typical of the topology, in series with the inductances of the input and output circuit, said switching device being arranged in the input and output stages of the converter, at each side of said galvanic insulation. so that said bi-directional converter circuit provides two modes of energy transfer which constitute a first mode of voltage reduction and a second mode of voltage raising, providing an identical transitory behaviour in both modes when a disturbance enters the regulation system, whether in the charge or in the input voltage, characterised in that said bi-directional converter is incorporated inside a first electrical distribution box for vehicles, comprising a microprocessor, electrical protection means and centralised electronic signal and power control means and in that a single microprocessor carries out the control of the converter and of said centralised signal and power control, with elimination of redundant components and possible sources of interference.

2. A system in accordance with claim 1, characterised in that said capacitance in parallel with a corresponding voltage source in the input and output stage of the bi-directional converter circuit has a value sensibly higher than the storage capacitances belonging to the topology.

3. A system in accordance with claim 2, characterised in that it includes a two-loop control system comprising an inner loop of current and an outer loop of voltage which ensures the regulation of line and charge with its own protection of the switching transitions.

4. A system in accordance with claim 3, characterised in that said control system comprises an input current controller block by modulating the width of the PWM impulses, with a power point from said input, whose block applies the switching functions to the first and second stages of the bi-directional converter circuit, and an output voltage control block, to which a reference voltage is applied and with a voltage power point from said output, which second block provides the first one with a reference current through said inner loop.

5. A system in accordance with claim 1, characterised in that electromagnetic screening means of said bi-directional converter inside the casing of said distribution box and thermal dissipation means of a supporting plate of the bi-directional converter have been provided.

6. A system in accordance with claim 5, characterised in that it comprises a single common earthing for the supporting plate of the converter and the board or boards of the electronic control means, so that the supply of charges by said bi-directional converter is facilitated.

7. A system in accordance with claim 5, characterised in that part of said electromagnetic screening means of the bi-directional converter at the upper and side parts are constituted by enveloping protections made of plastic material provided with aeration windows, upon which protections there is a layer of metallic deposition or a metallic grille, allowing for said windows, constituting.

8. A system in accordance with claim 5, characterised in that power conducting tracks of a printed circuit board upon which said bi-directional converter is arranged have a thickness of at least 400 μm suitable for conduction of power current, constituting part of said thermal dissipation means.

9. A system in accordance with claim 8, characterised in that said power. conducting tracks are sufficiently separated and covered with an insulating film to prevent the jumping of electric arcs.

10. A system in accordance with claim 1, characterised in that it further comprises ambient temperature control means, specific to said inner area of the casing occupied by the converter.

11. A system in accordance with claim 1, characterised in that it further comprises a second electrical distribution box including an unidirectional converter connected to the network at a superior voltage level and in that a centralised and power control unit including a microprocessor has been provided to relate the operation of both converters.

12. A system in accordance with claim 1, characterised in that it further comprises a second electric distribution box the management and control thereof being supplied from said first electric distribution box with two different voltages through a control unit.

13. A system in accordance with claim 11 or 12, characterised in that it further includes an ignition relay which only provides a supply to said at least one converter or control unit in the event that the ignition switch of the vehicle is closed.

14. A system in accordance with claim 1 comprising three centralised electrical distribution boxes in the engine compartment, passenger compartment and boot respectively, one of them including said bidirectional converter and a power management and control unit constituting said centralized electronic signal and power control means.

* * * * *